United States Patent [19]

Sanemitsu

[11] Patent Number: 5,426,432
[45] Date of Patent: Jun. 20, 1995

[54] IC CARD

[75] Inventor: Yoshikado Sanemitsu, Itami, Japan

[73] Assignee: Mitsubishi Denki Kabushiki Kaisha, Tokyo, Japan

[21] Appl. No.: 234,614

[22] Filed: Apr. 28, 1994

Related U.S. Application Data

[63] Continuation of Ser. No. 790,564, Nov. 12, 1991, abandoned.

[30] Foreign Application Priority Data

Nov. 13, 1990 [JP] Japan ................................. 2-308170

[51] Int. Cl.$^6$ ............................................. G03G 19/16
[52] U.S. Cl. .................................. 341/173; 341/180; 235/380
[58] Field of Search ............... 341/173, 180, 183, 195, 341/187, 189; 235/441, 487, 492, 380; 370/81

[56] References Cited

U.S. PATENT DOCUMENTS

| | | | |
|---|---|---|---|
| 4,025,906 | 5/1977 | Riikonen . | |
| 4,382,296 | 5/1983 | Joyce et al. | 370/81 |
| 4,810,862 | 3/1989 | Nakano et al. | 235/380 |
| 5,126,541 | 6/1992 | Shinagawa | 235/441 |

FOREIGN PATENT DOCUMENTS

3809795  3/1988  Germany .

Primary Examiner—Michael Horabik
Attorney, Agent, or Firm—Leydig, Voit & Mayer

[57] ABSTRACT

An IC card for outputting attribute information includes ROMs, a connector interfacing with an external unit, transmitting/receiving circuitry for exchanging control signals, address signals, and data, data output buffer for the ROMs mode control circuit for controlling the active or inactive state of each of the storage and data output buffer, and attribute information setting circuit containing the attribute information of the IC card. This card structure results in a reduced number of components, a simplified circuit configuration, and improved reliability.

4 Claims, 6 Drawing Sheets

IC CARD

This disclosure is a continuation of application Ser. No. 07/790,564, filed Nov. 12, 1991 now abandoned.

BACKGROUND OF THE INVENTION

1. Field of the Invention

This invention relates to an IC card having a circuit for outputting attribute information (for example, the type, capacity, and access time) of the IC card memory.

2. Description of the Related Art

Figure 4:
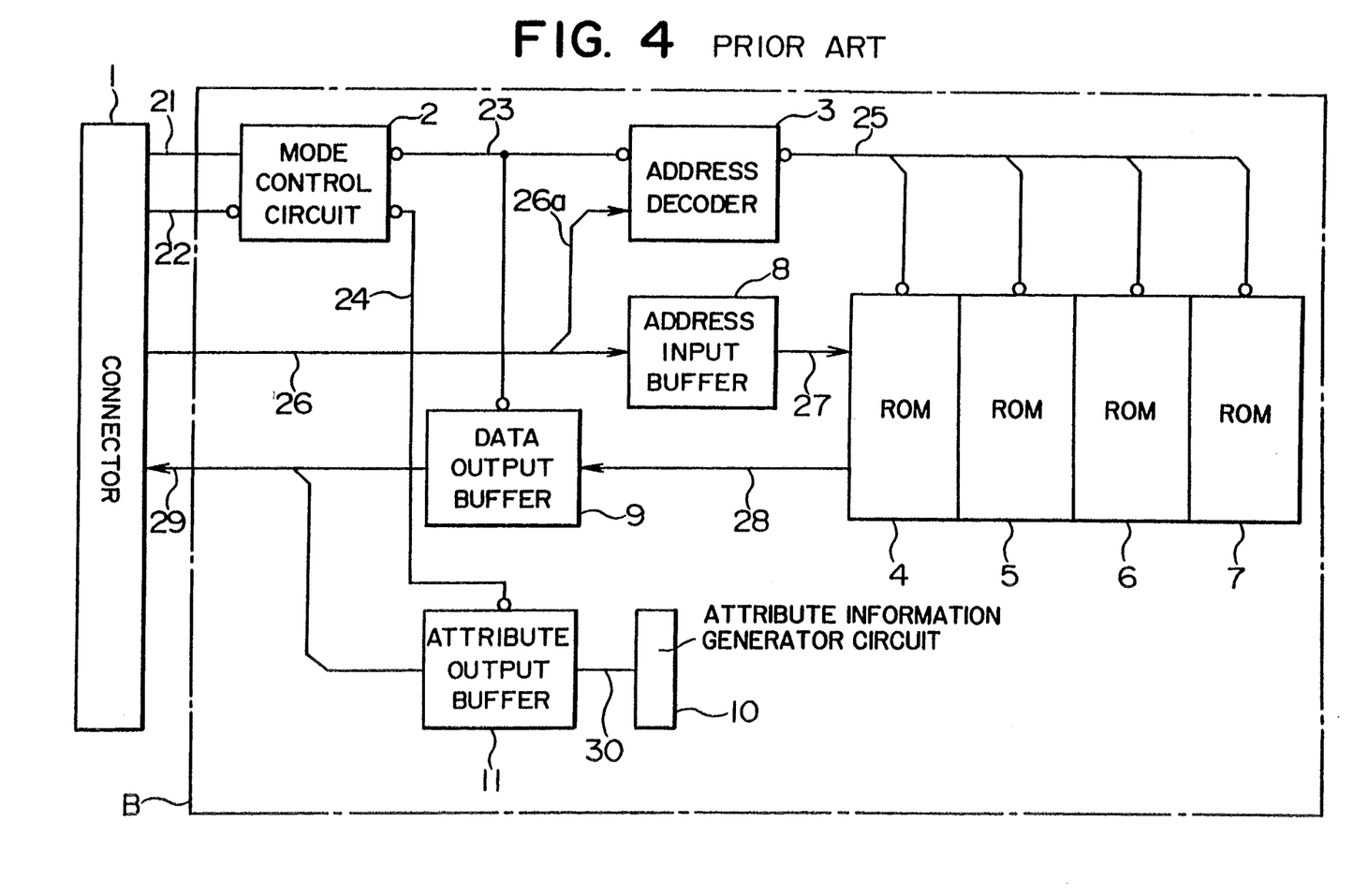
FIG. 4 is a block diagram showing the internal structure of a conventional IC card.

FIG. 4 is a block diagram showing an internal structure of a prior art IC card that employs read only semiconductor memories (hereafter ROMs). A mode control signal on a line 21 and a card enable signal on a line 22, connected through a connector 1, are supplied to a mode control circuit 2. One of the outputs of the mode control circuit 2 is a memory enable signal applied to a line 23. The memory enable signal line 23 is input to an address decoder 3 and a data output buffer 9. The address decoder 3 and an address input buffer 8 are provided with an address signal on a bus 26 via the connector 1. The address decoder 3 outputs a chip enable signal to a bus 25 to actuate one of ROMs 4 to 7. A post-buffer address signal 27 is input from the address input buffer 8 to the ROMs 4 to 7. A data signal on a bus 28 or an output of the ROMs 4 to 7 is provided as a data signal on a bus 29 to the connector 1 via the data output buffer 9. The data signals on the buses 28 and 29, address signals on buses 26, 26a, and 27, and chip enable signal on bus 25 are parallel signals which are, therefore, transmitted over a data bus, an address bus, and a signal bus, respectively.

Another output of the mode control circuit 2 is an attribute output buffer enable signal 24. This signal is input to an attribute output buffer 11. Respective pull-up and pull-down resistors for each of the pins are connected to the attribute output buffer 11 that is used to set attribute information. An attribute data signal on bus 30 for transmitting attribute information is output as a data signal on bus 29 to the connector 1 via the attribute output buffer 11.

A mode control circuit 2 is controlled by two input signals, a mode control signal on line 21 and a card enable signal on line 22. When the card enable signal is high, regardless of the level of the mode control signal, a memory enable signal on line 23 does not actuate an address decoder 3 and a data output buffer 9. Moreover, an attribute output buffer enable signal on line 24 does not actuate an attribute output buffer 11. Hereinafter, when a signal does not actuate a circuit, the signal is called inactive. When a signal actuates a circuit means, the signal is called active. When the card enable signal is low, if the mode control signal is high, the memory enable signal becomes active and the attribute output buffer enable signal becomes inactive. When the card enable signal is low, if the mode control signal is also low, the attribute output buffer enable signal becomes active and the memory enable signal becomes inactive.

Therefore, this kind of IC card has three output states.

(A) Standby state

In this state, both the memory enable signal and an attribute output buffer enable signal are inactive. The address decoder 3, ROMs 4 to 7 connected to the address decoder 3, the data output buffer 9, and the attribute output buffer 11 are not actuated. The data signal on bus 29 has a high impedance. To attain this state, the card enable signal must be high.

(B) ROM read state

This is a state in which data is read out from ROMs. A memory enable signal is active, and the address decoder 3 and the data output buffer 9 are actuated. However, the attribute buffer 11 is not actuated. At this time, any one of ROMs 4 to 7 is selected according to the upper-level address 26a of an address signal on the bus 26 actuated by a chip enable signal on the bus 25. Data accessed according to the lower-level address is read out, placed on a data signal on the bus 28, and output as a data signal on the bus 29 to the connector 1 via the data output buffer 9. To attain this state, the card enable signal must be low, and a mode control signal high. At this time, since the attribute output buffer 11 is not actuated, its output has a high impedance and, therefore, does not interrupt data reading from the ROMs.

(C) Attribute output data read state

This is a state in which attribute information is read out. The address decoder 3 and the data output buffer 9 are not actuated, the attribute output enable signal is active, and the attribute output buffer 11 is actuated. At this time, all of the ROMs 4 to 7 are not actuated but are held at a high impedance. The levels set by the pull-up and pull-down down resistors included in the attribute information generator circuit 10 are read out as attribute output data and placed on the data signal bus 29. To attain this state, the card enable signal must be low, and the mode control signal must also be low.

The address input buffer 8 and the data output buffer 9 are indispensable for reducing the load across the connector 1 and thereby improving the interface characteristic of the connector 1.

Figure 5:
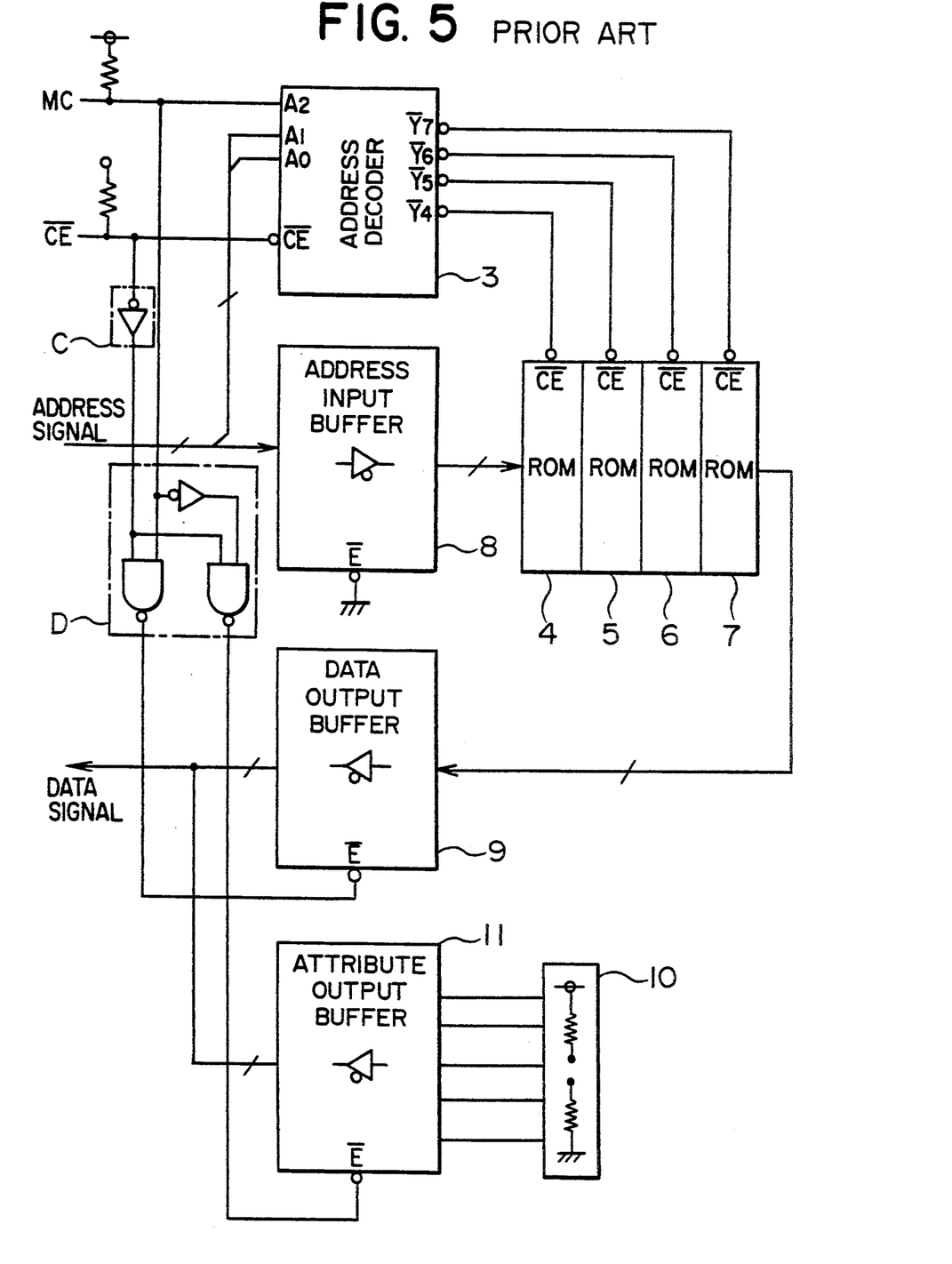
FIG. 5 is a schematic circuit diagram of a main section of the IC card shown in FIG. 4.

FIG. 5 is a circuit diagram showing section B of FIG. 4 more specifically. In FIG. 5, sections C and D and part of the functions of an address decoder form a mode control circuit 2.

Figure 6:
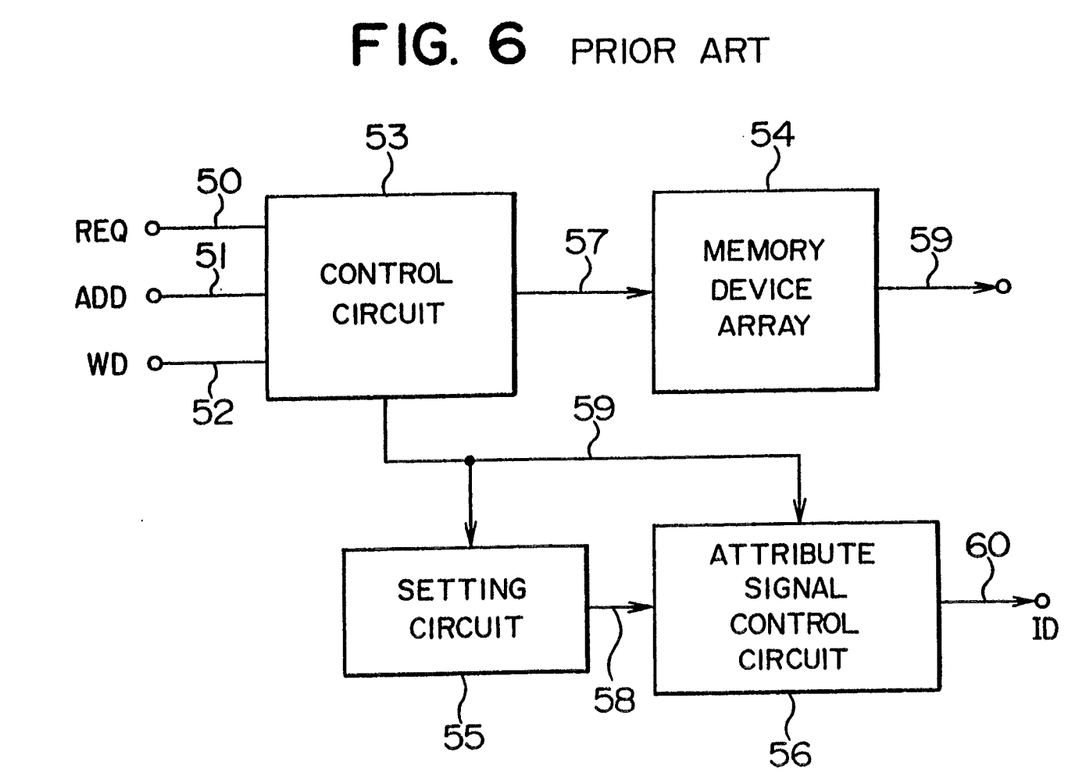
FIG. 6 is a block diagram showing the internal structure of a prior art IC card.

FIG. 6 is a block diagram showing the internal structure of an IC card disclosed in Japanese Patent Publication 63-237191. In FIG. 6, an access request signal line 50, an address select signal 51, and a write data line 52 from an upper-level unit handling a memory IC card are connected to a control circuit 53. The control circuit 53 controls all components in the memory IC card and provides a memory device array 54, an attribute signal setting circuit 55, and an attribute signal control circuit 56 with respective control signals 57 and 59. The memory device array 54 outputs read data on line 59. Upon switching of the switches, the attribute signal setting circuit 55 sets a signal for indicating the attribute of the memory IC card and then transmits the set signal on a line 58 to the attribute signal control circuit 56. The attribute signal control circuit 56 controls various kinds of attribute signals. Then, the output signal is transferred to the upper-level unit on line 60.

Prior art IC cards having the aforesaid configuration have several problems. For example, in the first described prior art card, an output buffer for reading data out of ROMs is incorporated independently of an attribute output buffer for reading out attribute output data. In the second described prior art card, an output channel of a memory device array is provided separately from an output channel for an attribute signal setting circuit and an attribute signal control circuit which is thought to include an attribute output buffer. Thus, both the first and second prior art structures include a large number of components. This results in a complex circuit configuration for an IC card and thereby reduces the reliability of the IC card.

SUMMARY OF THE INVENTION

The present invention aims to solve the aforesaid problems. Specifically, the circuit configuration of an IC card is simplified by reducing the number of components and a circuit for outputting attribute information is added so that reliability is improved.

A more specific object of the present invention is to provide an IC card comprising storage means for storing data, a connector for interfacing with an external unit, transmitting/receiving means for exchanging control signals, address signals, and data with the external unit via the connector, buffer means for the storage means that is connected to the transmitting/receiving means located between the connector and the storage means, control means for controlling the active or inactive state of each of the storage means and the buffer means based on the control signals sent from the external unit, and attribute information setting means connected to the transmitting/receiving means located between the storage means and the buffer means and containing the attribute information of the IC card. When the storage means is inactivated while the buffer means is activated under control of the control means, the attribute information contained in the attribute information setting means is output to the external unit via the buffer circuit and the connector.

In the IC card according to the present invention, when the storage means is inactivated and the buffer means for the storage means is activated by the control means the attribute information contained in the attribute information setting means connected to the transmitting/receiving means located between the storage means and the buffer means is output to an external unit via the transmitting/receiving means.

DESCRIPTION OF THE PREFERRED EMBODIMENTS

Figure 1:
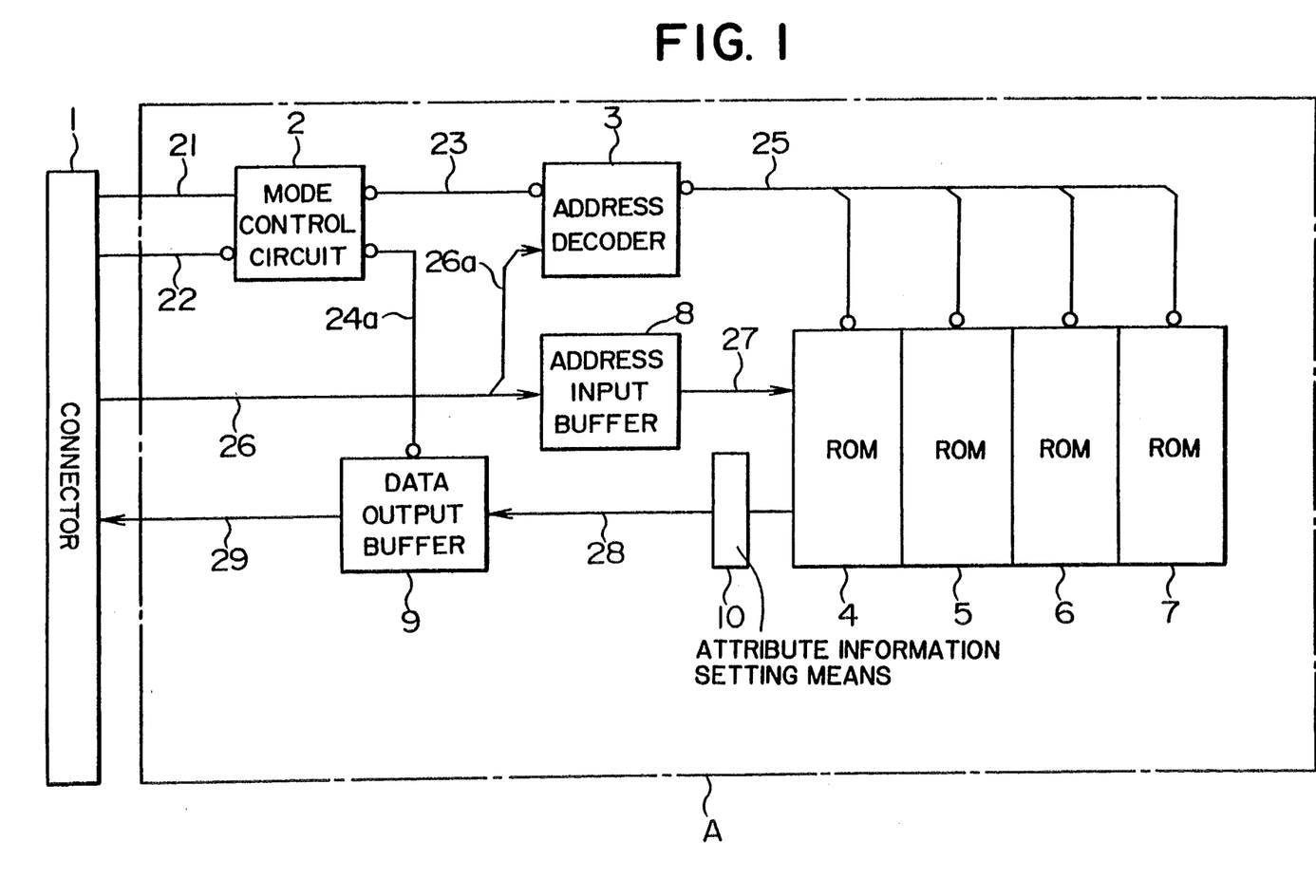
FIG. 1 is a block diagram showing the internal structure of an IC card according to a first embodiment of the present invention.

FIG. 1 is a block diagram showing the internal structure of an IC card according to an embodiment of the invention in which ROMs are employed as a storage means. Elements 1 to 10 denote the same components as those for the prior art structures and explanation of those elements is, therefore, omitted.

The embodiment of FIG. 1 differs from the prior art in that an attribute output buffer is omitted. Pull-up and pull-down resistors or other circuit elements that form an attribute information setting circuit for setting attribute information are arranged between the data terminals of the ROMs 4 to 7 and the data output buffer circuit 9.

A mode control signal on the line 21 and a card enable signal on the line 22 input via connector 1 are provided to the mode control circuit 2. One of the outputs of the mode control circuit 2 is a memory enable signal on the line 23 that is input exclusively to an address decoder 3. Another output of the mode control circuit 2 is an output buffer enable signal on the line 24a that is input to a data output buffer circuit 9. An address signal on the bus 26 is input to the address decoder 3 and the address input buffer 8 via the connector 1. Line 26a connects an upper-level address signal to the address decoder 3. The chip enable signal bus 25 carries output signals from the address decoder 3 to actuate one of the semiconductor memory elements, such as the ROMs 4 to 7, and a post-buffer address signal on the bus 27 from the address input buffer 8 is input to the ROMs 4 to 7. Thus, output data is specified. A data signal on the bus 28 or an output of the ROMs 4 to 7 is output as a data signal on the bus 29 to the connector 1 via the attribute information setting circuit 10 including pull-up and pull-down resistors and the data output buffer 9.

When the data output buffer 9 is activated by an output buffer enable signal on the line 24a and the ROMs 4 to 7 are inactivated by a memory enable signal on the line 23, an attribute data signal containing attribute information specified by the pull-up and pull-down resistors 100 is output as a data signal on the bus 29 from the connector 1 to an external unit via the data output buffer 9.

Figure 2:
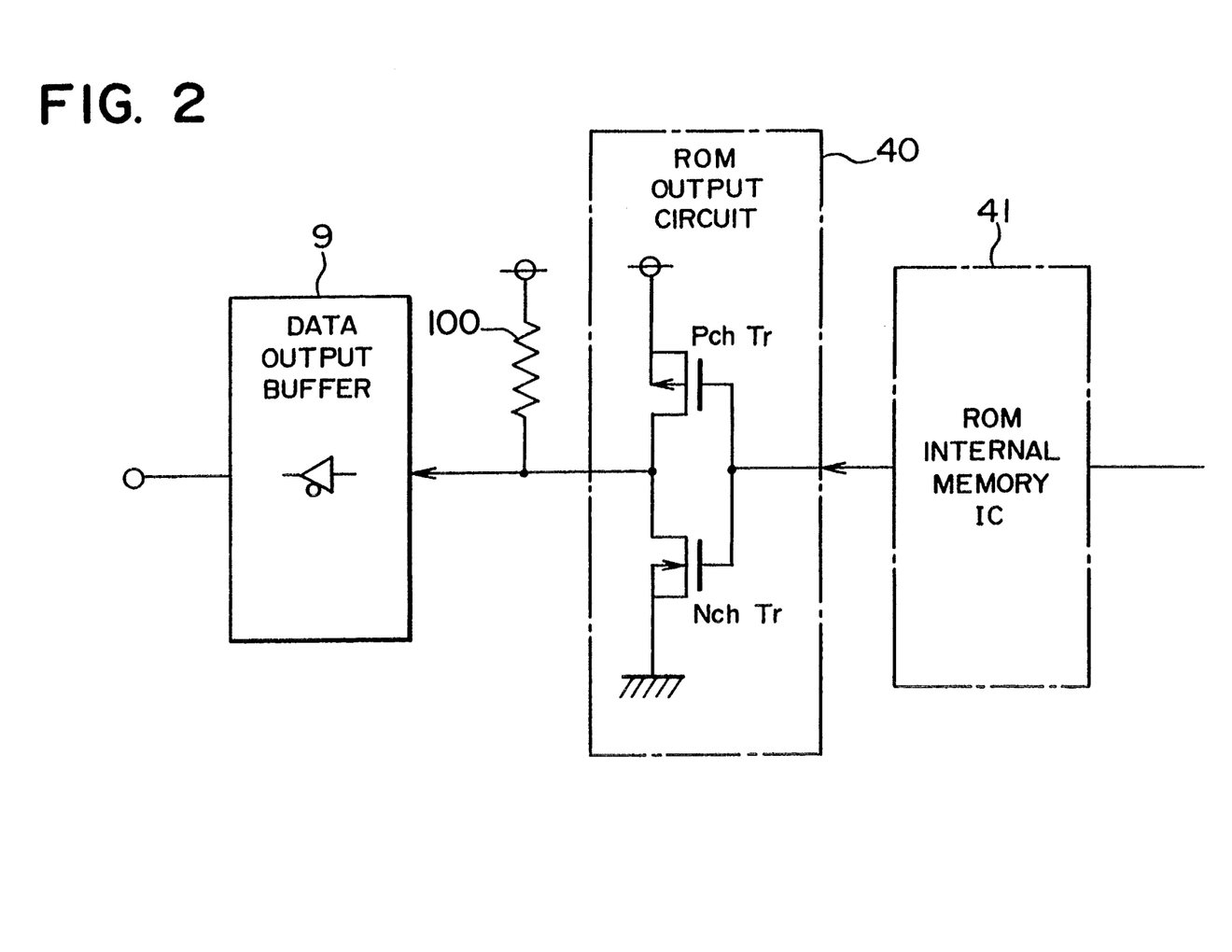
FIG. 2 is a schematic circuit diagram of an output section of the IC card shown in FIG. 1.
Figure 3:
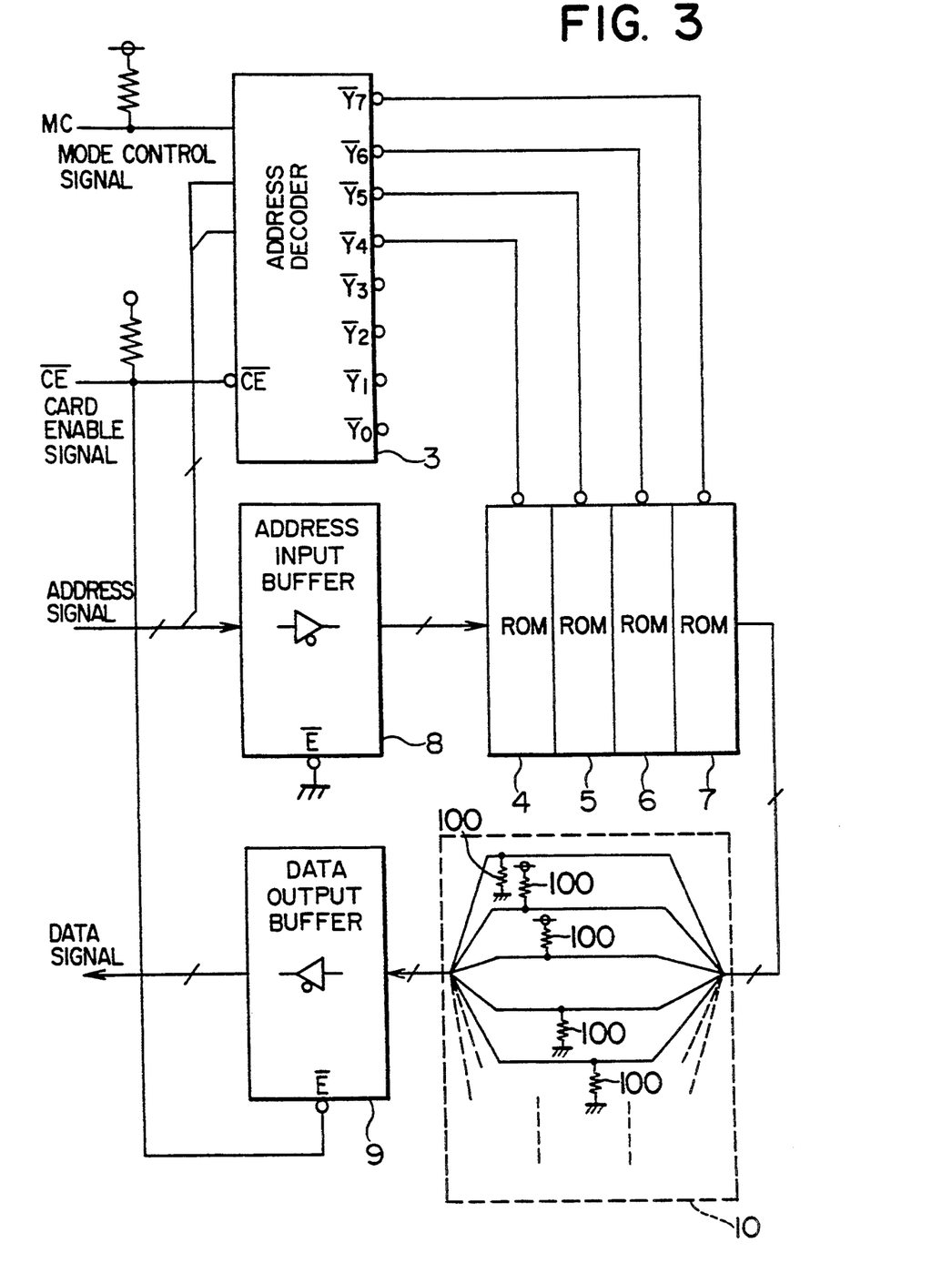
FIG. 3 is a schematic circuit diagram of a main section of the IC card shown in FIG. 1.

The attribute information setting circuit 10 comprising a plurality of pull-up and pull-down resistors is explained in more detail. The data signals on the buses 28 and 29, which are parallel signals as are the address signals, are transmitted over a data bus. The data bus is a bundle of data lines as shown in FIG. 3. A pull-up or pull-down resistor is connected to each data line as shown in FIGS. 2 and 3. Depending on the combination of pull-up and pull-down resistors, parallel signals, which are low or high as intended, are generated as attribute information.

In the embodiment shown in FIG. 1, the ROMs 4 to 7 form a storage means. The data output buffer 9 is part of a buffer means. The output mode control signal on the line 21, the card enable signal on the line 22, the memory enable signal on the line 23, the output buffer enable signal on line the 24a, the chip enable signal on the bus 25, the address signals on the buses 26, 26a, and 27, the data signals on the buses 28 and 29, the address decoder 3, and the address input buffer 8 are part of a transmitting/receiving means. The mode control circuit 2 operates as a control means. The attribute information setting circuit 10 comprising a plurality of pull-up and pull-down resistors 100 is part of an attribute information setting means. A control signal represents the mode control signal on the line 21 and the card enable signal on the line 22.

The mode control circuit 2 is controlled by two inputs, the mode control signal on the line 21 and the card enable signal on the line 22. When the card enable signal on the line 22 is high, regardless of the level of the mode control signal on the line 21, the memory enable signal 23 and the output buffer enable signal on the line 24a become inactive. When the card enable signal is low, if the mode control signal is high, the memory enable signal and output buffer enable signal become active. When the card enable signal is low, if the mode control signal is low, the memory enable signal becomes inactive and the output buffer enable signal becomes active.

As in prior art IC cards, the IC card according to the present invention has the following three states:

(A) Standby state

In this state, the memory enable signal on the line 23 and the output buffer enable signal on the line 24a are inactive, the address decoder 3, the ROMs 4 to 7 connected to the address decoder 3, and the data output buffer 9 are not actuated, and the data signal bus 29 is at high impedance.

To attain this state, the card enable signal on the line 22 must be high.

(B) ROM read state

This is a state in which ROMs are read out. The address decoder 3 and the data output buffer 9 are actuated.

To attain this state, the card enable signal on the line 22 must be low and the mode control signal on the line 21 must be high. At this time, according to the upper-level address on the bus 26a of the address signal bus 26, any one of the ROMs 4 to 7 is selected by the chip enable signal on the bus 25. In addition, data specified according to the lower-level address is read out and placed onto a data signal on the bus 28 and then output as a data signal on the bus 29 to the connector 1 via the data output buffer 9.

At this time, the data signal on the bus 29 is driven by any one of the ROMs 4 to 7. Neither the pull-up nor the pull-down resistors 10 affects the aforesaid operation. This result is explained referring to FIG. 2. In the circuit diagram of FIG. 2, a ROM output circuit 40 is a complementary metal oxide semiconductor (CMOS) circuit. A pull-up resistor 100 is connected to a data line between a ROM data terminal and the data output buffer 9. In the CMOS circuit 40, a P-channel transistor and an N-channel transistor are connected in series in that order between the power supply and ground. A data signal is provided to each of the transistor gates, and a data line is connected to the connection point of the transistors. When an output data signal of a ROM internal memory IC 41 is high, the P-channel transistor is turned off and the N-channel transistor is turned on. If the resistance of a pull-up resistor 100 is chosen so that the current flows through the pull-up resistor 100 will be less than the current capacity of the N-channel transistor, the N-channel transistor will conduct current flowing through the pull-up resistor 100. As a result, a low-level signal is transmitted to the data output buffer 9. When an output signal of the ROM internal memory IC 41 is low, the P-channel transistor is turned on and the N-channel transistor is turned off so that no current flows from the pull-up resistor 100. Consequently, a high-level signal is transmitted to the data output buffer 9. In the same manner, even when a pull-down resistor is connected, a signal sent from a ROM output circuit is transmitted to the data output buffer circuit 9 without changing level. In this case, the resistance of the pull-down resistor should be set so that when the P-channel transistor is on, the data line is held high by the current flowing from the power supply through the P-channel transistor.

(C) Attribute output data read state

This is a state in which attribute information is read out. The address decoder 3 is inactive while the data output buffer is active.

To attain this state, the card enable signal must be low and the mode control signal must be low. At this time, none of the ROMs 4 to 7 operates and they remain at a high impedance. Therefore, a data signal on the bus 28 goes to a level specified by the pull-up or pull-down resistors 100. Therefore, the information in the data signal on the bus 28 is read out as attribute information via the data output buffer 9 and output as a data signal on the bus 29 to a connector 1. FIG. 3 is a circuit diagram showing the section A of FIG. 1 more specifically. In FIG. 3, part of the address decoder forms a mode control circuit 2.

In the embodiment described, ROMs are incorporated in the card. SRAMs, EEPROMs, OPTROMs, or other storage means can be employed to construct the same circuit. If SRAMs or other writable storage means are used, an input-output buffer, instead of an output buffer, is connected to a data line between the SRAMs and the connector. The circuit configuration of the attribute information setting circuit comprising pull-up and pull-down resistors is identical to that of the aforesaid embodiment. Therefore, a detailed explanation of this alternative embodiment is omitted.

The circuit of the present invention may be a hybrid IC or a monolithic IC on a semiconductor substrate.

According to the present invention, a data output buffer also Operates as an attribute output buffer. This results in a reduced number of components in an IC card, thus improving reliability.

I claim:

1. An IC card comprising:
   a connector for receiving a card enable signal in one of first and second control states and a mode control signal in one of third and fourth control states from an external unit;
   a data buffer having an output terminal connected to the connector for reducing a load across the connector and an input terminal;
   a memory for storing and outputting data, the memory having an output circuit including an output terminal connected to the input terminal of the data buffer;
   an attribute information setting device connected to the input terminal of the data buffer and to the output terminal of the output circuit, the attribute information setting device storing attribute information of the IC card; and
   a control circuit connected to the connector, the data buffer, and the memory for controlling the IC card to operate in a standby mode when the card enable signal is in the first control state regardless of the control state of the mode control signal, no data being output by the data buffer in the standby mode, a memory read mode when the card enable signal is in the second control state and the mode control signal is in the third control state, the data buffer outputting data from the memory in the memory read mode, and an attribute read mode when the card enable signal is in the second control state and the mode control signal is in the fourth control state, the data buffer outputting the attribute information in the attribute read mode.

2. The IC card according to claim 1 wherein the input terminal of the data buffer is connected to the output terminal of the memory by a plurality of data lines and wherein the attribute information setting device includes one of a pull-up resistor and a pull-down resistor respectively connected to each of the data lines for storing the attribute information of the IC card.

3. The IC card according to claim 2 wherein the output circuit includes an inverter connected at an output to a data line connected to a pull-up resistor and having a p-channel and n-channel transistor connected in series, the n-channel transistor having a current capacity wherein, in the ROM read mode, any current flowing through the pull-up resistor is less than the current capacity of the n-channel transistor.

4. The IC card according to claim 2 wherein the output circuit includes an inverter connected at an output to a data line connected to a pull-down resistor and having a p-channel and n-channel transistor connected in series, the p-channel transistor having a current capacity wherein, in the ROM read mode, any current flowing through the pull-down resistor is less than the current capacity of the p-channel transistor.

* * * * *